United States Patent
Truong et al.

(10) Patent No.: US 10,047,860 B2
(45) Date of Patent: Aug. 14, 2018

(54) PUMP SWITCHING CONTROL SYSTEMS AND METHODS FOR CONTINUOUSLY VARIABLE TRANSMISSIONS

(71) Applicant: GM Global Technology Operations LLC, Detroit, MI (US)

(72) Inventors: Minh Q. Truong, Commerce Township, MI (US); Bret M. Olson, Whitelake, MI (US); Chinar S. Ghike, Farmington Hills, MI (US); Craig J. Hawkins, Howell, MI (US); Steven P. Moorman, Dexter, MI (US); Paul G. Otanez, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 15/171,110

(22) Filed: Jun. 2, 2016

(65) Prior Publication Data

US 2017/0350504 A1    Dec. 7, 2017

(51) Int. Cl.
| | |
|---|---|
| *F16H 59/00* | (2006.01) |
| *F16H 61/00* | (2006.01) |
| *F16H 63/00* | (2006.01) |
| *F16H 61/662* | (2006.01) |
| *F16H 59/18* | (2006.01) |

(52) U.S. Cl.
CPC ....... *F16H 61/66272* (2013.01); *F16H 59/18* (2013.01); *F16H 61/0021* (2013.01); *F16H 61/662* (2013.01)

(58) Field of Classification Search
CPC ......... F16H 61/66272; F16H 61/66259; F16H 61/0021; F16H 2061/6608; F16H 61/12
USPC ............................................................ 474/28
See application file for complete search history.

(56) References Cited

U.S. PATENT DOCUMENTS

| 15,171 | A | * | 6/1856 | Croadsdale | ................ | A21C 5/04 |
|---|---|---|---|---|---|---|
| | | | | | | 222/218 |
| 4,628,773 | A | * | 12/1986 | Itoh | ........................ | B60W 30/18 |
| | | | | | | 474/28 |
| 4,665,775 | A | * | 5/1987 | Nagamatsu | ....... | F16H 61/66263 |
| | | | | | | 474/12 |
| 4,753,627 | A | * | 6/1988 | Kawamoto | ............... | F16H 9/12 |
| | | | | | | 474/18 |

(Continued)

OTHER PUBLICATIONS

U.S. Appl. No. 15/171,016, filed Jun. 2, 2016, Truong et al.

*Primary Examiner* — Henry Y Liu

(57) ABSTRACT

A target module determines a target ratio between a speed of an input shaft and a speed of an output shaft of a continuously variable transmission (CVT) based on an accelerator pedal position. A maximum rate of change (ROC) module determines a maximum ROC of the target ratio. A switching valve control module, based on a comparison of the maximum ROC and a ROC of the target ratio, selectively actuates a switching valve of the CVT one of (i) from a closed position to an open position and (ii) from the open position to the closed position. The switching valve prevents transmission fluid flow through a flow path between a transmission fluid pump and a pressure regulator valve of the CVT when the switching valve is in the closed position. The switching valve allows transmission fluid flow through the flow path when the switching valve is in the open position.

20 Claims, 6 Drawing Sheets

(56) References Cited

U.S. PATENT DOCUMENTS

| | | | | |
|---|---|---|---|---|
| 5,108,348 A * | 4/1992 | Bornmann | F16H 61/66272 474/18 |
| 5,342,246 A * | 8/1994 | Mori | F16H 61/0272 474/1 |
| 6,090,000 A * | 7/2000 | Senger | F16H 61/12 474/18 |
| 6,099,424 A * | 8/2000 | Tsai | F16H 61/662 474/12 |
| 6,179,739 B1 * | 1/2001 | Tsai | F16H 61/66272 474/12 |
| 6,290,620 B1 * | 9/2001 | Tsai | F16H 61/66272 474/12 |
| 6,364,802 B1 * | 4/2002 | Yi | F16H 61/143 475/120 |
| 6,428,445 B1 * | 8/2002 | Friedmann | F16H 57/0434 474/28 |
| 6,739,994 B1 * | 5/2004 | Van Rooij | F16H 61/0031 474/18 |
| 6,824,483 B1 * | 11/2004 | Van Der Laan | F16H 61/66272 474/18 |
| 6,835,147 B2 * | 12/2004 | Iwata | F16H 61/12 474/18 |
| 7,041,018 B2 * | 5/2006 | Ochiai | F16H 57/0434 474/18 |
| 7,074,144 B2 * | 7/2006 | Nobu | F16H 61/66272 474/18 |
| 7,104,907 B2 * | 9/2006 | Jozaki | F16H 61/66272 474/18 |
| 7,192,371 B2 * | 3/2007 | Yamamoto | F16H 61/66272 474/18 |
| 7,201,684 B2 * | 4/2007 | Nobu | F16H 61/14 474/28 |
| 7,229,372 B2 * | 6/2007 | Shimanaka | F16H 61/66272 474/18 |
| 7,677,997 B2 * | 3/2010 | Hiramatsu | F16H 55/56 137/112 |
| 7,931,551 B2 | 4/2011 | Katou et al. | |
| 7,951,026 B2 * | 5/2011 | Soga | F16H 61/0021 474/28 |
| 7,993,225 B2 * | 8/2011 | Ogata | F16H 61/12 474/28 |
| 8,012,051 B2 * | 9/2011 | Soga | F16H 61/12 474/110 |
| 8,038,553 B2 * | 10/2011 | Soga | F16H 61/66272 474/18 |
| 8,066,595 B2 * | 11/2011 | Ogata | F16H 61/0021 474/103 |
| 8,517,871 B2 * | 8/2013 | Ogata | F16H 61/66272 474/18 |
| 9,068,648 B2 * | 6/2015 | Moehlnnann | F16H 61/0021 |
| 9,441,733 B2 * | 9/2016 | Takahashi | F16H 59/20 |
| 9,950,709 B2 * | 4/2018 | Farahani | B60W 30/188 |
| 2006/0194671 A1 * | 8/2006 | Katou | F16H 61/66272 477/46 |
| 2007/0082769 A1 * | 4/2007 | Nihei | F16H 61/0021 474/8 |
| 2007/0232423 A1 * | 10/2007 | Katou | F16H 61/66272 474/28 |
| 2008/0300075 A1 * | 12/2008 | Yoshinami | F16H 61/0025 474/28 |
| 2009/0069131 A1 * | 3/2009 | Soga | F16H 61/66272 474/18 |
| 2009/0069146 A1 * | 3/2009 | Soga | F16H 61/12 476/3 |
| 2011/0067968 A1 * | 3/2011 | Hanyu | F16H 61/0206 192/3.29 |
| 2011/0073196 A1 * | 3/2011 | Ishikawa | F16H 61/0021 137/487.5 |
| 2011/0238272 A1 * | 9/2011 | Kato | B60W 10/06 701/55 |
| 2013/0330216 A1 * | 12/2013 | Yoshida | F15B 1/024 417/410.1 |
| 2015/0144207 A1 * | 5/2015 | Inagaki | F16H 61/00 137/487.5 |
| 2015/0184744 A1 * | 7/2015 | Inagawa | F16H 61/0025 474/28 |
| 2015/0314787 A1 * | 11/2015 | Ono | F02D 11/105 701/110 |

* cited by examiner

US 10,047,860 B2

PUMP SWITCHING CONTROL SYSTEMS AND METHODS FOR CONTINUOUSLY VARIABLE TRANSMISSIONS

CROSS-REFERENCE TO RELATED APPLICATIONS

This application is related to U.S. patent application Ser. No. 15/171,016 filed on Jun. 2, 2016. The disclosure of the above application is incorporated herein by reference in its entirety.

FIELD

The present disclosure relates to vehicle transmissions and more particularly to control systems and methods for controlling switching of a transmission fluid pump of a continuously variable transmission.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque and outputs torque to a transmission. An automatic transmission of a vehicle may include a plurality of fluid controlled friction elements, such as clutches. A control module may engage and disengage the friction elements to establish different gear ratios (also called speed ratios) within the transmission.

The transmission includes a transmission fluid pump. The transmission fluid pump provides transmission fluid for applying the clutches of the transmissions, lubricating transmission components, and cooling transmission components. Some transmission fluid pumps are mechanically driven, such as by the engine. Other transmission fluid pumps are electrically driven.

SUMMARY

In a feature, a transmission fluid control system of a vehicle is described. A target module determines a target ratio between a speed of an input shaft and a speed of an output shaft of a continuously variable transmission (CVT) based on an accelerator pedal position. A maximum rate of change (ROC) module determines a maximum ROC of the target ratio. A switching valve control module, based on a comparison of the maximum ROC and a ROC of the target ratio, selectively actuates a switching valve of the CVT one of (i) from a closed position to an open position and (ii) from the open position to the closed position. The switching valve also directs transmission fluid back to the transmission fluid pump when the switching valve is in the closed position. The switching valve prevents transmission fluid flow through a flow path between a transmission fluid pump and a pressure regulator valve of the CVT when the switching valve is in the closed position. The switching valve allows transmission fluid flow through the flow path when the switching valve is in the open position.

In further features, the transmission fluid pump further pumps transmission fluid to the pressure regulator valve through a second flow path both (i) when the switching valve is in the open position and (ii) when the switching valve is in the closed position.

In further features, the switching valve control module transitions the switching valve of the CVT from the closed position to the open position when the ROC of the target ratio is greater than the maximum ROC.

In further features, the switching valve control module selectively transitions the switching valve of the CVT from the open position to the closed position when the ROC of the target ratio is less than the maximum ROC.

In further features, the switching valve control module selectively transitions the switching valve of the CVT from the open position to the closed position when the ROC of the target ratio is less than the maximum ROC and at least one other maximum ROC of the target ratio for when the switching valve is in the closed position.

In further features, a target pressure module, based on the target ratio, determines (i) a first target pressure of transmission fluid applied to a first pulley actuator and (ii) a second target pressure of transmission fluid applied to a second pulley actuator. The first pulley actuator is coupled to the input shaft of the CVT and expands and contracts based on a first pressure of the transmission fluid applied to the first pulley actuator. The second pulley actuator is coupled to the output shaft of the CVT and expands and contracts based on a second pressure of the transmission fluid applied to the second pulley actuator. One of (i) a belt and (ii) a chain encircles the first and second pulley actuators.

In further features, a first pulley valve control module controls opening of a first valve based on the first target pressure. The first valve receives transmission fluid from the pressure regulator valve and controls transmission fluid flow to the first pulley actuator. A second pulley valve control module controls opening of a second valve based on the second target pressure. The second valve receives transmission fluid from the pressure regulator valve and controls transmission fluid flow to the second pulley actuator.

In further features, a shift module indicates an upshift when a change in the target ratio is greater than a predetermined value and determines a second maximum ROC of the target ratio that may occur between a beginning and an end of the upshift. The maximum ROC module determines the maximum ROC of the target ratio for upshifts. The switching valve control module selectively actuates the switching valve of the CVT from the closed position to the open position when the second maximum ROC is greater than the maximum ROC.

In further features, a shift module indicates a downshift when a change in the target ratio is greater than a predetermined value and determines a second maximum ROC of the target ratio that may occur between a beginning and an end of the downshift. The maximum ROC module determines the maximum ROC of the target ratio for downshifts. The switching valve control module selectively actuates the switching valve of the CVT from the closed position to the open position when the second maximum ROC is greater than the maximum ROC.

In further features, a shift module indicates that no shift has been commanded when a change in the target ratio is less than a predetermined value. The target module further determines a target ROC of the target ratio based on the accelerator pedal position. When no shift has been commanded, the switching valve control module actuates the switching valve from the closed position to the open position when the target ROC is greater than the maximum ROC. When no shift has been commanded, the switching valve control module actuates the switching valve from the open position to the closed position when the target ROC is less than the maximum ROC.

In a feature, a transmission fluid control method is described. The transmission fluid control method includes: determining a target ratio between a speed of an input shaft and a speed of an output shaft of a continuously variable transmission (CVT) based on an accelerator pedal position; determining a maximum rate of change (ROC) of the target ratio; and based on a comparison of the maximum ROC and a ROC of the target ratio, selectively actuating a switching valve of the CVT one of (i) from a closed position to an open position and (ii) from the open position to the closed position. The switching valve prevents transmission fluid flow through a flow path between a transmission fluid pump and a pressure regulator valve of the CVT when the switching valve is in the closed position. The switching valve also directs transmission fluid back to the transmission fluid pump when the switching valve is in the closed position. The switching valve allows transmission fluid flow through the flow path when the switching valve is in the open position.

In further features, the transmission fluid pump further pumps transmission fluid to the pressure regulator valve through a second flow path both (i) when the switching valve is in the open position and (ii) when the switching valve is in the closed position.

In further features, the transmission fluid control method further includes selectively transitioning the switching valve of the CVT from the closed position to the open position when the ROC of the target ratio is greater than the maximum ROC.

In further features, the transmission fluid control method further includes selectively transitioning the switching valve of the CVT from the open position to the closed position when the ROC of the target ratio is less than the maximum ROC.

In further features, the transmission fluid control method further includes selectively transitioning the switching valve of the CVT from the open position to the closed position when the ROC of the target ratio is less than the maximum ROC and at least one other maximum ROC of the target ratio for when the switching valve is in the closed position.

In further features, the transmission fluid control method further includes, based on the target ratio, determining (i) a first target pressure of transmission fluid applied to a first pulley actuator and (ii) a second target pressure of transmission fluid applied to a second pulley actuator. The first pulley actuator is coupled to the input shaft of the CVT and expands and contracts based on a first pressure of the transmission fluid applied to the first pulley actuator. The second pulley actuator is coupled to the output shaft of the CVT and expands and contracts based on a second pressure of the transmission fluid applied to the second pulley actuator. One of (i) a belt and (ii) a chain encircles the first and second pulley actuators.

In further features, the transmission fluid control method further includes: controlling opening of a first valve based on the first target pressure, wherein the first valve receives transmission fluid from the pressure regulator valve and controls transmission fluid flow to the first pulley actuator; and controlling opening of a second valve based on the second target pressure, wherein the second valve receives transmission fluid from the pressure regulator valve and controls transmission fluid flow to the second pulley actuator.

In further features, the transmission fluid control method further includes: indicating an upshift when a change in the target ratio is greater than a predetermined value; determining a second maximum ROC of the target ratio that may occur between a beginning and an end of the upshift, wherein determining the maximum ROC includes determining the maximum ROC of the target ratio for upshifts; and selectively actuating the switching valve of the CVT from the closed position to the open position when the second maximum ROC is greater than the maximum ROC.

In further features, the transmission fluid control method further includes: indicating a downshift when a change in the target ratio is greater than a predetermined value; determining a second maximum ROC of the target ratio that may occur between a beginning and an end of the downshift, wherein determining the maximum ROC includes determining the maximum ROC of the target ratio for downshifts; and selectively actuating the switching valve of the CVT from the closed position to the open position when the second maximum ROC is greater than the maximum ROC.

In further features, the transmission fluid control method further includes: indicating that no shift has been commanded when a change in the target ratio is less than a predetermined value; determining a target ROC of the target ratio based on the accelerator pedal position; when no shift has been commanded, actuating the switching valve from the closed position to the open position when the target ROC is greater than the maximum ROC; and when no shift has been commanded, actuating the switching valve from the open position to the closed position when the target ROC is less than the maximum ROC.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine generates drive torque for a vehicle. A continuously variable transmission (CVT) transfers torque to one or more wheels of the vehicle. A transmission fluid pump pumps transmission fluid to a line pressure regulator valve via one transmission fluid path. The transmission fluid pump also pumps transmission fluid to a switching valve located in a second transmission fluid path between the transmission fluid pump and the line pressure regulator valve. The switching valve can open to provide a first transmission fluid flowrate to the line pressure regulator valve and can be closed to provide a portion (e.g., one-half) of the first transmission fluid flowrate to the line pressure regulator valve while the other portion is returned to the transmission pump suction. A fuel efficiency increase may be realized when the switching valve is closed due to the transmission fluid pump imposing a lesser load.

The CVT includes a primary pulley and a secondary pulley. The primary pulley is coupled to an input shaft, and the secondary pulley is coupled to an output shaft. Via the output shaft, torque is transferred to one or more wheels of the vehicle. A belt or chain encircles the primary and secondary pulleys.

The primary pulley includes a primary pulley actuator that expands and contracts based upon a transmission fluid pressure applied to the primary pulley actuator and centrifugal force. The secondary pulley includes a secondary pulley actuator that expands and contracts based upon a transmission fluid pressure applied to the secondary pulley actuator, centrifugal force, and a spring force. The primary and secondary pulley actuators vary a speed ratio between the input and output shafts of the CVT via the expansion and contraction.

A control module controls pressures of transmission fluid applied to the primary and secondary pulley actuators based on a target speed ratio between the input and output shafts of the CVT. Various limitations may limit how fast a change in the target speed ratio can be accomplished. Examples of limitations include pressure limitations and output limitations of the transmission fluid pump.

According to the present disclosure, the control module determines maximum rates of change of the speed ratio for various limitations and controls the switching valve based on the maximum rates of change. For example, the control module may transition the switching valve from the closed position to the open position when a target rate of change of the speed ratio is greater than one or more of the maximum rates of change. The control module may transition the switching valve from the open position to the closed position when the target rate of change is less than all of the maximum rates of change for operation with the switching valve in the closed position.

Figure 1A:
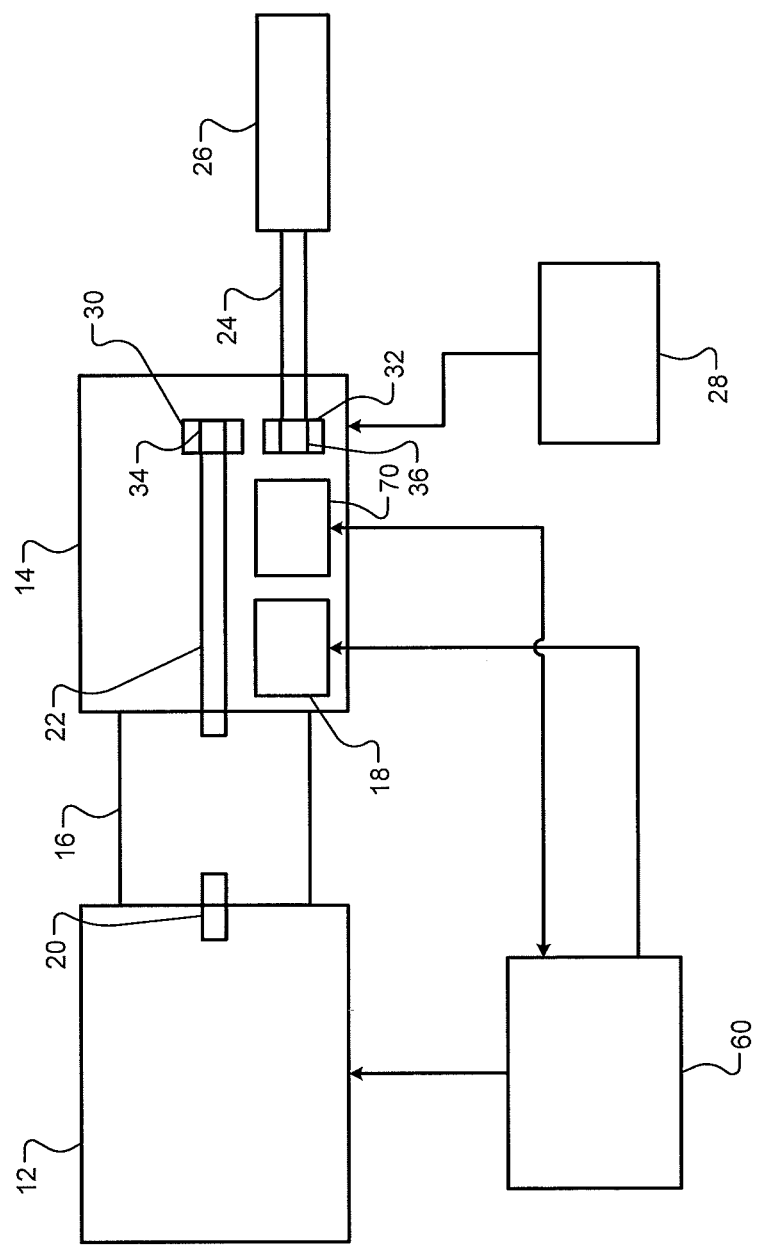
FIGS. 1A-1B are functional block diagrams of an example vehicle system.
Figure 1B:
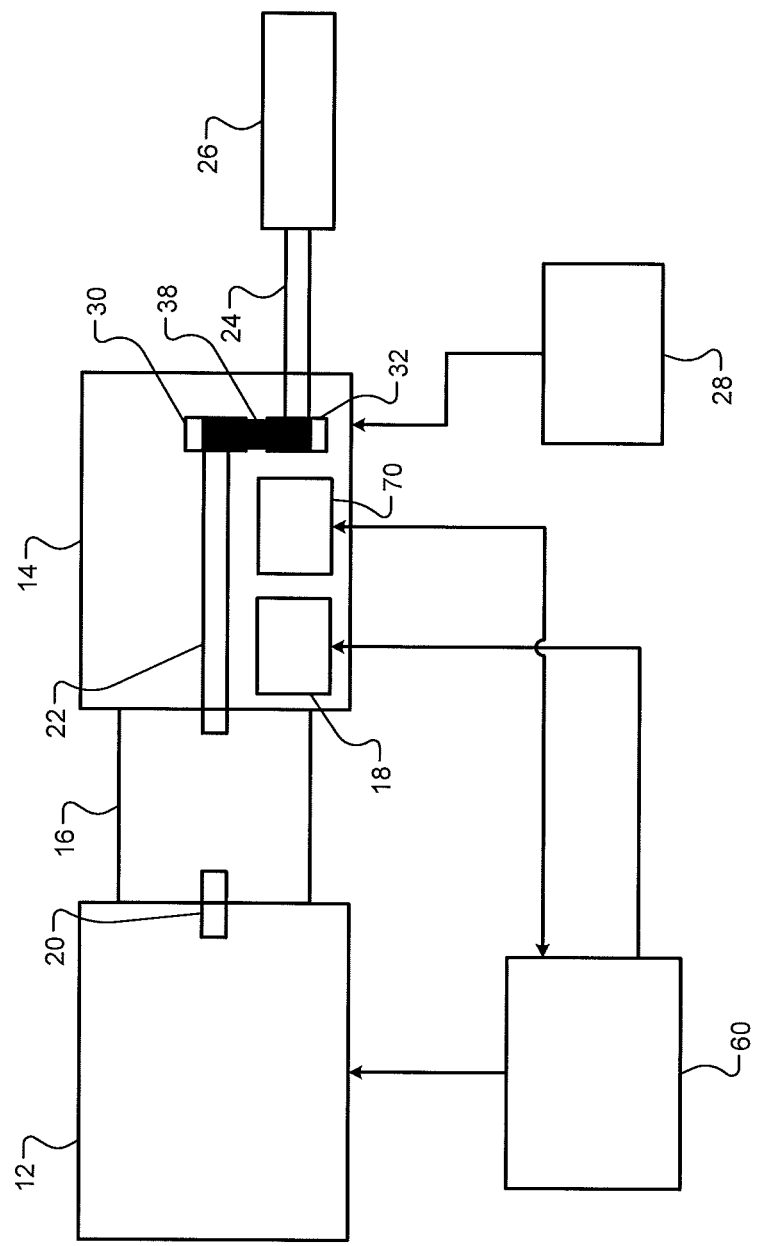

FIGS. 1A and 1B include functional block diagrams of an example vehicle system. An internal combustion engine 12 drives a transmission 14 via a torque converter 16. The engine 12 may include, for example, a spark-ignition engine, a compression-ignition engine, or another suitable type of engine. A vehicle may also include one or more electric motors and/or motor generator unit (MGUs), such as MGU 18.

The engine 12 outputs torque to the torque converter 16 via an engine output shaft 20, such as a crankshaft. The torque converter 16 supplies torque to the transmission 14 via a transmission input shaft 22. In some cases, the torque converter 16 may be omitted. The electric motor(s) and/or MGU(s) may also output torque to the transmission input shaft 22 to supplement or replace engine torque output. A MGU may convert mechanical energy into electrical energy under some circumstances, for example, to recharge one or more batteries and/or to supply power for electronic components of the vehicle.

The transmission 14 transfers torque between the transmission input shaft 22 and a transmission output shaft 24. A drive ratio may refer to or be based on the ratio between the rotational speed of the transmission input shaft 22 and the rotational speed of the transmission output shaft 24. The transmission output shaft 24 drives a driveline 26, and the driveline 26 transfers torque to wheels (not shown) of the vehicle. A range selector 28 enables a user to select a mode of operation of the transmission 14. The mode may include, for example, a park mode, a reverse mode, a neutral mode, or one or more forward drive modes.

The transmission 14 is a continuously variable transmission (CVT). A primary pulley 30 is coupled to and rotates with the transmission input shaft 22. A secondary pulley 32 is coupled to and rotates with the transmission output shaft 24. The primary pulley 30 includes a primary pulley actuator 34 that expands and contracts based on a pressure of transmission fluid applied to the primary pulley actuator 34. The secondary pulley 32 includes a secondary pulley actuator 36 that expands and contracts based on a pressure of transmission fluid applied to the secondary pulley actuator 36. While the example of the primary pulley 30 being directly coupled to the transmission input shaft 22 is provided, the primary pulley 30 may be indirectly coupled to the transmission input shaft 22 via one or more torque transfer devices. Also, while the example of the secondary pulley 32 being directly coupled to the transmission output shaft 24 is provided, the secondary pulley 32 may be indirectly coupled to the transmission output shaft 24 via one or more torque transfer devices.

As shown in FIG. 1B, a belt or chain 38 encircles the primary and secondary pulleys 30 and 32 to link rotation of the transmission input shaft 22 and the transmission output shaft 24. Expansion and contraction of the primary and secondary pulley actuators 34 and 36 vary the rotation ratio between the transmission input shaft 22 and the transmission output shaft 24.

An engine control module (ECM) 60 controls operation of the engine 12. The ECM 60 or another control module (not shown) may control operation of one or more electric motors and/or MGUs in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data.

Figure 2:
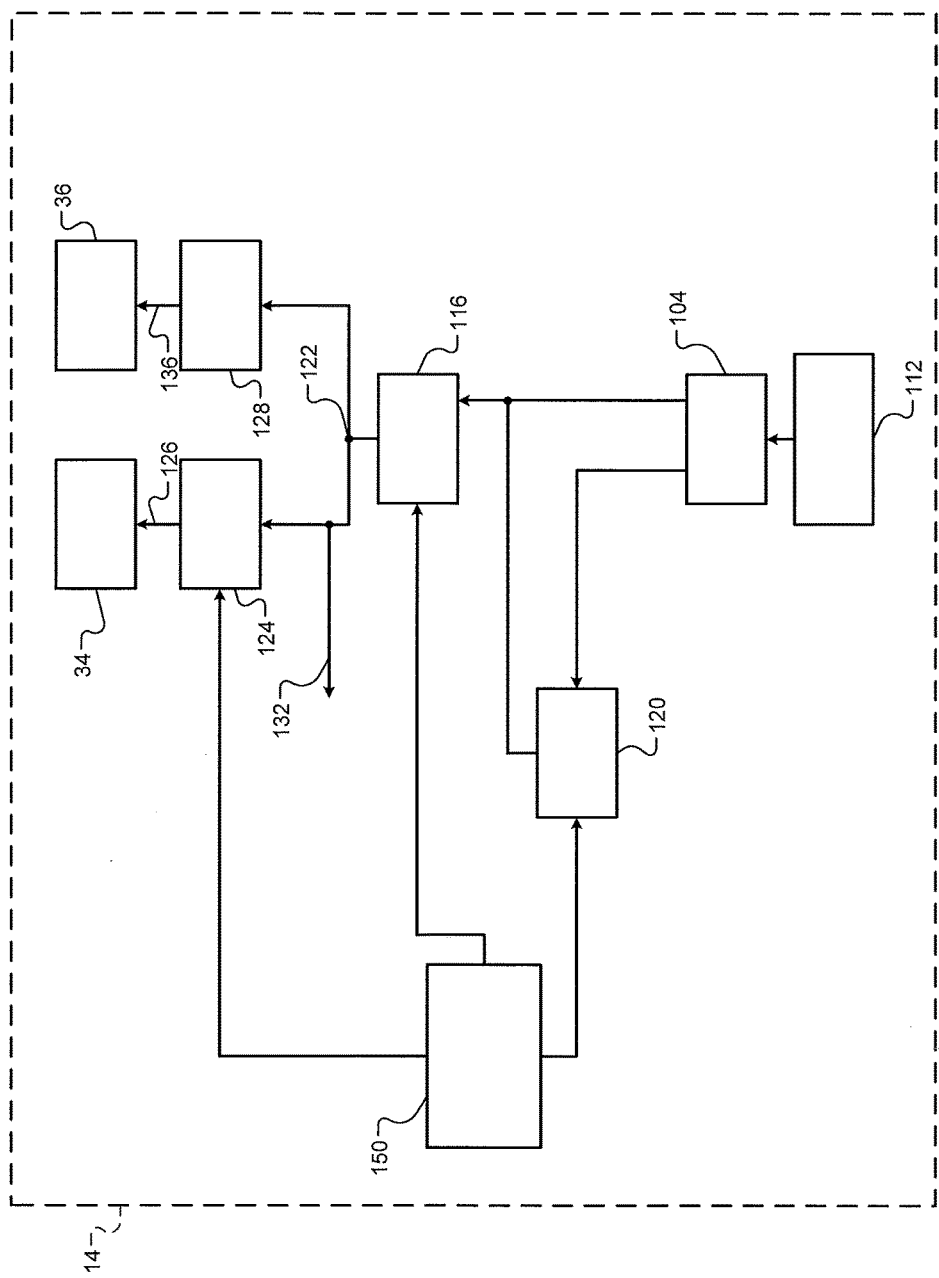
FIG. 2 is a functional block diagram of an example continuously variable transmission (CVT) system.

Referring now to FIG. 2, a functional block diagram of an example implementation of a CVT system is presented. The CVT 14 includes a transmission fluid pump 104 that draws transmission fluid from a sump 112 or another suitable transmission fluid source. The transmission fluid pump 104 is mechanically driven by the engine 12, such as by rotation of the crankshaft 20 or the transmission input shaft 22.

The transmission fluid pump 104 outputs the transmission fluid to a pressure regulator valve 116 via a first fluid path. The transmission fluid pump 104 also outputs the transmission fluid to a switching valve 120 via a second fluid path. When the switching valve 120 is open, the transmission fluid flows from the transmission fluid pump 104 through the switching valve 120 to the pressure regulator valve 116. In various implementations, the switching valve 120 may be integrated within the transmission fluid pump 104. When the switching valve 120 is closed, the second fluid path is connected back to pump suction.

The pressure regulator valve 116 regulates the flow and/or pressure of the transmission fluid to a primary pulley valve 124, a secondary pulley valve 128, and/or for one or more other actuators/functions 132. The pressure regulator valve 116 also regulates flow and/or pressure of transmission fluid output for other actuators/functions 134 via a separate fluid path. The other actuators and/or functions 132 and 134 may include, for example, the torque converter 16 (e.g., clutch), forward/reverse clutches, one or more variable bleed solenoid (VBS) valves or variable force solenoids (VFS) that regulate transmission fluid flow and pressure to the various valves and components, cooling of the CVT 14, and/or lubrication of components of the CVT 14. One output pressure of the pressure regulator valve 116 may be referred to as a line pressure 122.

The primary pulley valve 124 regulates the flow (and pressure) of the transmission fluid to the primary pulley actuator 34. For example, the primary pulley valve 124 may be opened to increase the flow/pressure of the transmission fluid to the primary pulley actuator 34 and expand the primary pulley actuator 34. The primary pulley valve 124 may be closed to decrease the flow/pressure of the transmission fluid to the primary pulley actuator 34 and contract the primary pulley actuator 34. An output pressure of the primary pulley valve 124 may be referred to as a primary pulley pressure 126

The secondary pulley valve 128 regulates the flow (and pressure) of the transmission fluid to the secondary pulley actuator 36. For example, the secondary pulley valve 128 may be opened to increase the flow of the transmission fluid to the secondary pulley actuator 36 and expand the secondary pulley actuator 36. The secondary pulley valve 128 may be closed to decrease the flow of the transmission fluid to the secondary pulley actuator 36 and contract the secondary pulley actuator 36. An output pressure of the secondary pulley valve 128 may be referred to as a secondary pulley pressure 136. Respective VBS or VFS valves (not shown) may be used, for example, to control the flow/pressure of the transmission fluid from the switching valve 120, primary and secondary pulley valves 124 and 128, and pressure regulator valve 116.

A fluid control module 150 controls actuation of the switching valve 120, the pressure regulator valve 116, the primary pulley valve 124, and the secondary pulley valve 128. Generally speaking, the fluid control module 150 actuates the switching valve 120 to one of two discrete positions at a given time: an open position; or a closed position. The fluid control module 150 transitions the switching valve 120 between the two discrete positions under some circumstances.

When the switching valve 120 is in the closed position, the transmission fluid pump 104 operates in a partial (e.g., half) mode operation. The switching valve 120 blocks transmission fluid flow through the second fluid path when in the closed position and connects the second path to pump suction, so the transmission fluid pump 104 pumps transmission fluid to the pressure regulator valve 116 only through the first fluid path. Since the transmission fluid pump 104 is driven by the engine 12, a fuel efficiency increase (i.e., a fuel consumption decrease) of the engine 12 may be realized (relative to full mode operation) during operation in the partial mode as the transmission fluid pump 104 imposes a lesser torque load on the engine 12.

When the switching valve 120 is in the open position, the transmission fluid pump 104 operates in a full mode operation. The switching valve 120 enables transmission fluid flow through the second fluid path when in the open position, so the transmission fluid pump 104 pumps transmission fluid to the pressure regulator valve 116 through both of the first and second fluid paths.

The fluid control module 150 may transition the switching valve 120 from the closed position to the open position under various circumstances. For example only, the fluid control module 150 may transition the switching valve 120 from the closed position to the open position when a rate of change of the target ratio between the input and output shafts 22 and 24 is greater than a predetermined value. The fluid control module 150 may also transition the switching valve 120 from the open position to the closed position under various circumstances. For example, the fluid control module 150 may transition the switching valve 120 from the open position to the closed position when a rate of change of the target ratio between the input and output shafts 22 and 24 is less than a predetermined value.

Figure 3:
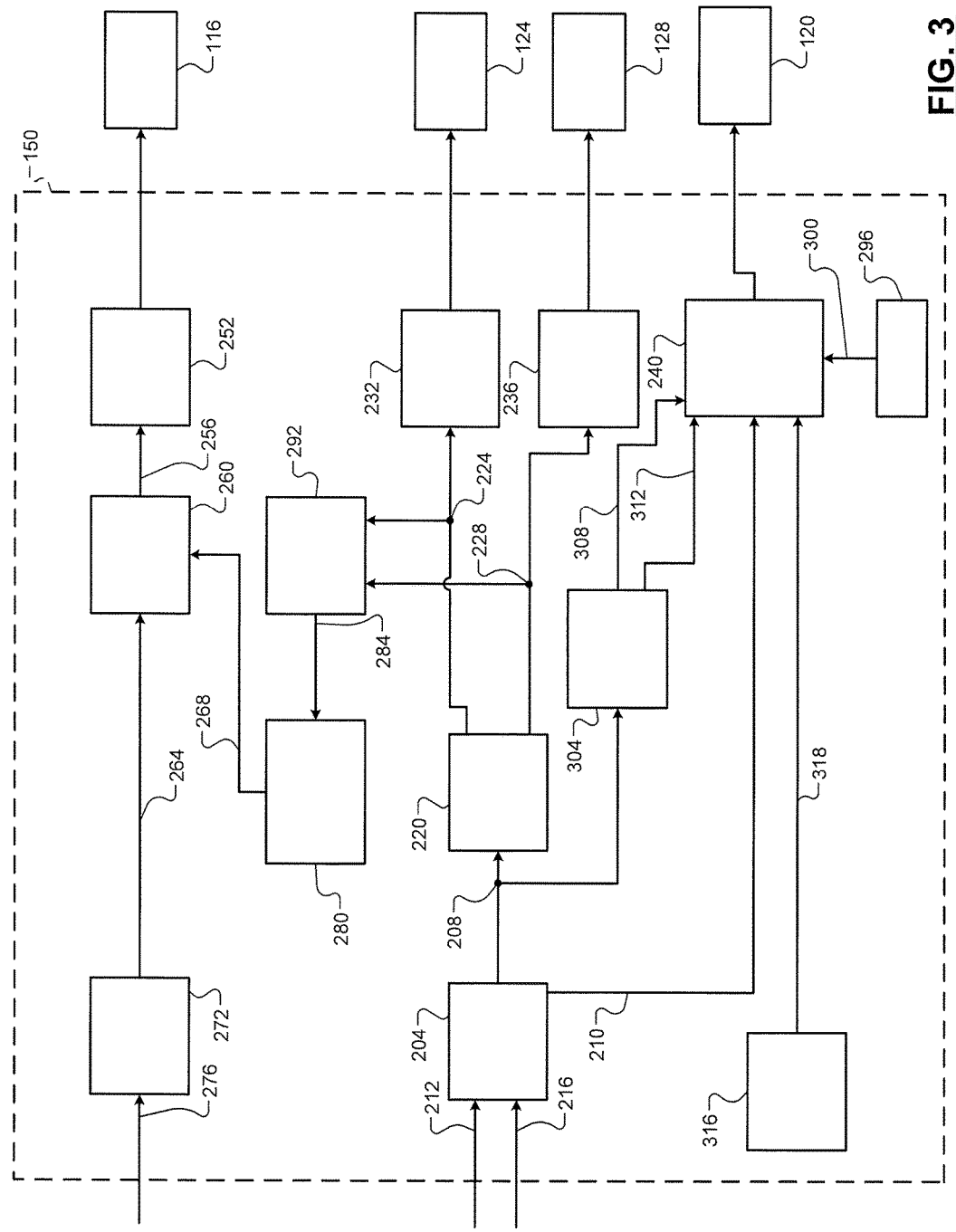
FIG. 3 is a functional block diagram of an example transmission fluid control system.

Referring now to FIG. 3, a functional block diagram of an example transmission fluid control system is presented. The fluid control module 150 may be implemented independently, within the TCM 70, or within another suitable module.

A target ratio module 204 determines a target ratio (between the input and output shafts 22 and 24) and a target rate of change (ROC) 210 of the target ratio to be achieved using the primary and secondary pulley actuators 34 and 36. The target ratio module 204 may determine the target ratio and the target ROC 210 of the target ratio, for example, based on an accelerator pedal position (APP) 212, a vehicle speed 216, and/or one or more other suitable parameters. The target ratio module 204 may determine the target ratio and the target ROC 210 of the target ratio, for example, using one or more lookup tables or functions that relate the APP 212 and the vehicle speed 216 to the target ratio and to the target ROC 210 of the target ratio.

A first target pressure module 220 determines a target primary pulley pressure 224 and a target secondary pulley pressure 228 based on the target ratio and the target ROC 210 of the target ratio. The target primary pulley pressure 224 corresponds to a target value of the primary pulley pressure 126. The target secondary pulley pressure 228 corresponds to a target value of the secondary pulley pressure 136. The first target pressure module 220 may determine the target primary pulley pressure 224 and the target secondary pulley pressure 228, for example, using one or more look up tables or functions that relate the target ratio and/or the target ROC 210 of the target ratio to the target primary pulley pressure 224 and the target secondary pulley pressure 228.

A primary valve control module 232 controls opening of the primary pulley valve 124 based on the target primary pulley pressure 224. The primary valve control module 232 may control the opening of the primary pulley valve 124, for example, in closed loop based on a difference between the target primary pulley pressure 224 and a measured or estimated value of the primary pulley pressure 126. For example, the primary valve control module 232 may open the primary pulley valve 124 as the target primary pulley pressure 224 increases, and vice versa, under some circumstances.

A secondary valve control module 236 controls opening of the secondary pulley valve 128 based on the target secondary pulley pressure 228. The secondary valve control module 236 may control the opening of the secondary pulley valve 128, for example, in closed loop based on a difference between the target secondary pulley pressure 228 and a measured or estimated value of the secondary pulley pressure 136. For example, the secondary valve control module 236 may open the secondary pulley valve 128 as the target secondary pulley pressure 228 increases, and vice versa, under some circumstances.

A switching valve control module 240 controls actuation of the switching valve 120. As stated above, the switching valve 120 is operated in one of the open position and the closed position. The switching valve control module 240 selectively transitions the switching valve 120 from the open position to the closed position and from the closed position to the open position, as discussed further below.

A regulator valve control module 252 controls opening of the pressure regulator valve 116 based on an adjusted target line pressure 256. The adjusted target line pressure 256 corresponds to a target value of the line pressure 122. For example, the regulator valve control module 252 may open the pressure regulator valve 116 as the adjusted target line pressure 256 increases, and vice versa, under some circumstances.

An adjusting module 260 adjusts a target line pressure 264 based on a pressure adjustment 268 to produce the adjusted target line pressure 256. The adjusting module 260 may, for example, set the adjusted target line pressure 256 equal to or based on a sum or a product of (a) the target line pressure 264 and (b) the pressure adjustment 268.

A second target pressure module 272 determines the target line pressure 264. For example, the second target pressure module 272 may receive one or more target line pressure requests 276 and set the target line pressure 264 equal to or based on a greatest (maximum) one of the target line pressure requests 276. Target line pressure requests may be generated for various reasons and actuators. For example, a target line pressure request may be generated for achieving the target ratio, controlling the torque converter clutch, lubrication, and/or cooling.

An adjustment determination module 280 determines the pressure adjustment 268. The adjustment determination module 280 may set the pressure adjustment 268 to a predetermined value under some circumstances. The adjusting module 260 sets the adjusted target line pressure 256 equal to the target line pressure 264 when the pressure adjustment 268 is set to the predetermined value. For example, the predetermined value may be 0.0 in the example of the adjusting module 260 setting the adjusted target line pressure 256 equal to a sum of the target line pressure 264 and the pressure adjustment 268. In the example of the adjusting module 260 setting the adjusted target line pressure 256 equal to a product of the target line pressure 264 and the pressure adjustment 268, the predetermined value may be 1.0.

The adjustment determination module 280 may determine the pressure adjustment 268 based on a maximum target pressure 284 under some circumstances, such as when the switching valve control module transitions the switching valve 120 from the closed position to the open position. The adjustment determination module 280 may also determine the pressure adjustment 268 based on the maximum target pressure 284 when the switching valve control module transitions the switching valve 120 from the open position to the closed position. The adjustment determination module 280 may determine the pressure adjustment 268 based on the maximum target pressure 284 using one or more lookup tables that relate maximum target pressures to pressure adjustments.

A maximum module 292 determines the maximum target pressure 284 based on the target primary pulley pressure 224, the target secondary pulley pressure 228, and the target line pressure 264. For example, the maximum module 292 may set the maximum target pressure 284 equal to or based on a greatest (maximum) one of target primary pulley pressure 224, the target secondary pulley pressure 228, and the target line pressure 264.

An open module 296 generates an open signal 300 when one or more conditions for the switching valve 120 being in the open position are present. For example, the open module 296 may generate the open signal 300 when a service request is received to position the switching valve 120 in the open position. A service device/tool may be connected to the vehicle, for example, via an on-board diagnostic (OBD) port of the vehicle and transmit the service request. Additionally or alternatively, the open module 296 may generate the open signal 300 when one or more predetermined faults have been diagnosed. Additionally or alternatively, the open module 296 may generate the open signal 300 when a position of a brake pedal is greater than a predetermined position or a rate of depression of the brake pedal is greater than a predetermined rate. While three example conditions have been provided, the open module 296 may generate the open signal 300 when one or more other conditions occur.

The switching valve control module 240 transitions the switching valve 120 from the closed position to the open position when the open signal 300 is generated. If the switching valve 120 is already in the open position, the switching valve control module 240 may maintain the switching valve 120 in the open position when the open signal 300 is generated. The open signal 300 may be used to override normal control of the switching valve 120. When the open signal 300 is not generated, the switching valve control module 240 may control the switching valve 120 using normal control, as discussed further below.

"Shifts," such as upshifts and downshifts, may refer to a change in the target ratio that is greater than a predetermined value. A shift module 304 generates a shift signal 308 that indicates whether an upshift, a downshift, or no shift has been commanded by a driver. For example, the shift module 304 may set the shift signal 308 to indicate that an upshift has been commanded when the target ratio increases by at least a predetermined upshift value. The shift module 304 may set the shift signal 308 to indicate that a downshift has been commanded when the target ratio decreases by at least a predetermined downshift value. The shift module 304 may set the shift signal 308 to indicate that no shift has been commanded when neither an upshift nor a downshift has been commanded.

The predetermined upshift and downshift values may be fixed or variable. For example, the predetermined upshift and downshift values may vary based on the current ratio of the speed of the transmission input shaft 22 to the speed of the transmission output shaft 24. The shift module 304 may determine the predetermined upshift and downshift values, for example, using one or more lookup tables that relate current ratios to predetermined upshift and downshift values.

The shift module 304 also determines a maximum ROC 312 in the target ratio for upshifts and downshifts. The maximum ROC 312 for a shift (upshift or downshift) corresponds to a maximum ROC in the target ratio that may occur between a beginning of that shift and an end of that shift. The shift module 304 may determine the maximum ROC 312 for a shift, for example, based on a previous value of the target ratio before the shift was commanded, the target ratio that indicated that the shift was commanded, the ROC of the APP 212, the vehicle speed 216, and/or one or more other suitable parameters. The shift module 304 may determine the maximum ROC 312, for example, using one or more lookup tables or functions that relate the previous value of the target ratio, the target ratio, the ROC of the APP 212, and the vehicle speed 216 to the maximum ROC 312.

Two limitations on changes in the target ratio include limitations on pressure of transmission fluid at the primary and secondary pulley actuators 34 and 36 and limitations on flow of transmission fluid to the primary and secondary pulley actuators 34 and 36. Limitations on pressure of transmission fluid at the primary and secondary pulley actuators 34 and 36 may be attributable to, for example, limitations on the line pressure 122 and limitations on the primary and secondary pulley pressures 126 and 136. Limitations on the flow of transmission fluid to the primary and secondary pulley actuators 34 and 36 may be attributable to, for example, the transmission fluid pump 104.

A maximum ROC module 316 determines a plurality of maximum ROCs 318 in the target ratio for upshifts, downshifts, for line pressure limitations, for pulley pressure limitations, for operation with the switching valve 120 in the open position, and for operation with the switching valve 120 in the closed position. The switching valve control module 240 may transition the switching valve 120 to the closed position or to the open position based on one or more of the maximum ROCs 318, the target ROC 210, and/or the maximum ROC 312, as discussed further below.

Figure 4:
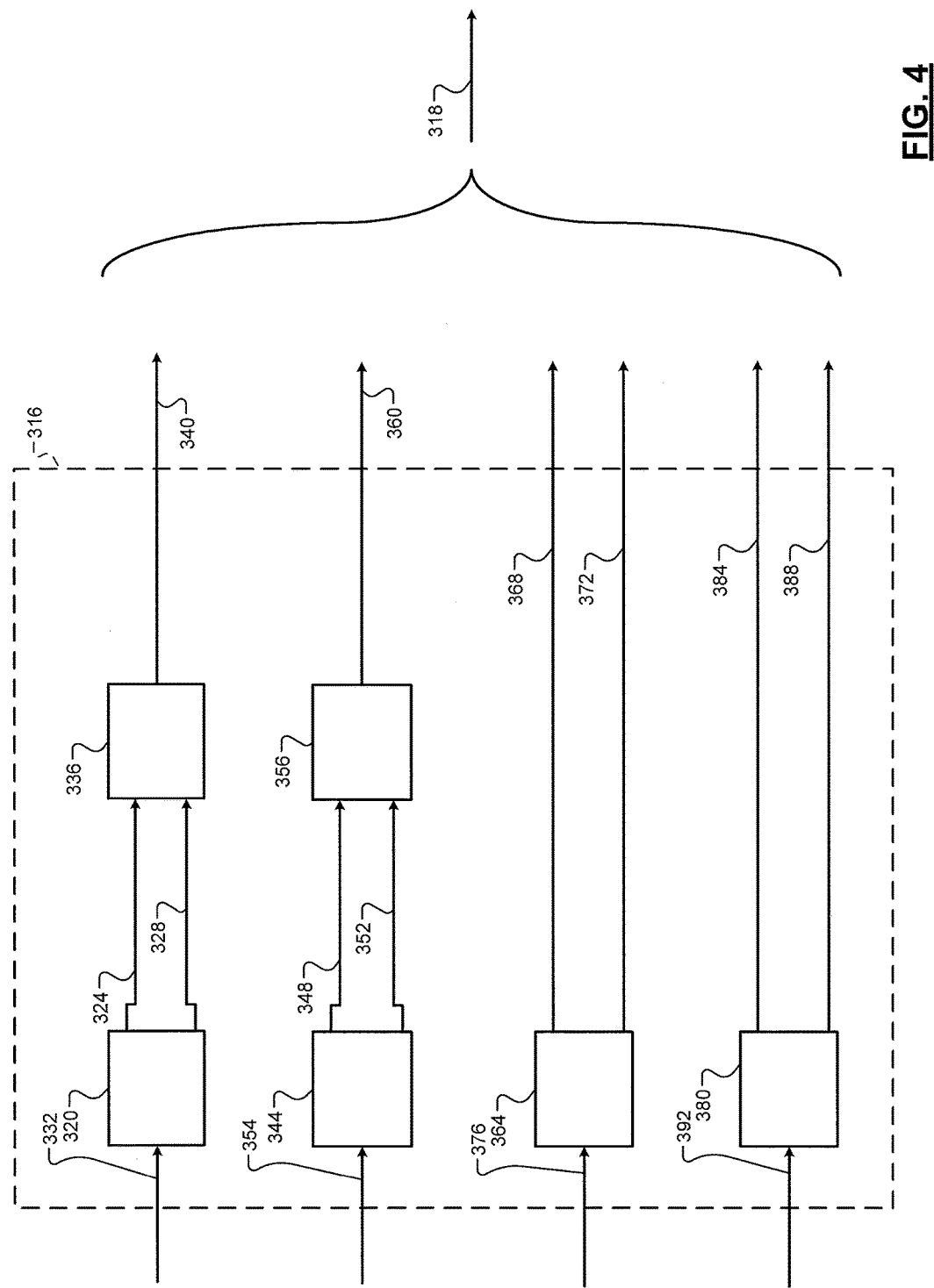
FIG. 4 is a functional block diagram of an example maximums module.

FIG. 4 includes a functional block diagram of an example implementation of the maximum ROC module 316. A first upshift maximums module 320 determines a first maximum upshift ROC 324 in the target ratio. The first maximum upshift ROC 324 corresponds to maximum ROC in the target ratio based on a maximum value of the line pressure 122 during an upshift. The first upshift maximums module 320 also determines a second maximum upshift ROC 328 in the target ratio. The second maximum upshift ROC 328 corresponds to maximum ROC in the target ratio based on a maximum value of the primary pulley pressure 126 during an upshift.

The first upshift maximums module 320 determines the first and second maximum upshift ROCs 324 and 328 based on a steady state primary pulley pressure, a maximum primary pulley pressure, a maximum line pressure, and a ratio maintenance value. The steady state primary pulley pressure may correspond to a pressure necessary to maintain torque at the primary pulley 30 at a ratio of speed of the transmission input shaft 22 to speed the transmission output shaft 24. The maximum primary pulley pressure may correspond to a maximum value of the primary pulley pressure 126 and may be a predetermined value. The maximum line pressure may correspond to a maximum value of the line pressure 122 and may be a predetermined value. The ratio maintenance value may correspond to a ratio of a net force at the primary pulley 30 to a net force at the secondary pulley 32 to maintain a ratio of speed of the transmission input shaft 22 to speed the transmission output shaft 24. The ratio maintenance value may be determined based on the ratio of speed of the transmission input shaft 22 to speed the transmission output shaft 24, the primary pulley pressure 126 relative to a minimum value of the primary pulley pressure to maintain the ratio, and the secondary pulley pressure 136 relative to a minimum value of the primary pulley pressure to maintain the ratio.

The first upshift maximums module 320 may determine the first and second maximum upshift ROCs 324 and 328 further based on a transmission fluid temperature and a current ratio of the speed of the transmission input shaft 22 to speed of the transmission output shaft 24. The transmission fluid temperature may be, for example, measured using a transmission fluid temperature sensor. The current ratio of the speed of the transmission input shaft 22 to speed of the transmission output shaft 24 may be determined, for example, based on a ratio of a measured speed of the transmission input shaft 22 and a measured speed of the transmission output shaft 24.

The steady state primary pulley pressure, the maximum primary pulley pressure, the maximum line pressure, and the ratio maintenance value, the transmission fluid temperature, and the current ratio are collectively illustrated in FIG. 4 by inputs 332. The first upshift maximums module 320 may determine the first maximum upshift ROC 324 using one or more functions or lookup tables that relate values of the inputs to first maximum upshift ROCs. The first upshift maximums module 320 may determine the second maximum upshift ROC 328 using one or more functions or lookup tables that relate values of the inputs to second maximum upshift ROCs.

A first minimum module 336 selects a minimum (smaller) one of the first and second maximum upshift ROCs 324 and 328. The first minimum module 336 outputs the selected one of the first and second maximum upshift ROCs 324 and 328 as a third maximum upshift ROC 340.

A first downshift maximums module 344 determines a first maximum downshift ROC 348 in the target ratio. The first maximum downshift ROC 348 corresponds to maximum ROC in the target ratio based on a maximum value of the line pressure 122 during a downshift. The first downshift maximums module 344 also determines a second maximum downshift ROC 352 in the target ratio. The second maximum downshift ROC 352 corresponds to maximum ROC in the target ratio based on a maximum value of the secondary pulley pressure 136 during a downshift.

The first downshift maximums module 344 determines the first and second maximum downshift ROCs 348 and 352 based on a steady state secondary pulley pressure, a maximum secondary pulley pressure, the maximum line pressure, and the ratio maintenance value. The maximum secondary pulley pressure may be the same as the maximum primary pulley pressure. The steady state secondary pulley pressure may correspond to a pressure at the secondary pulley actuator 36 to maintain a ratio (of transmission input shaft speed to transmission output shaft speed) when the primary pulley pressure 126 is at a predetermined pressure.

The first downshift maximums module 344 may determine the first and second maximum downshift ROCs 348 and 352 further based on the transmission fluid temperature and the current ratio of the speed of the transmission input shaft 22 to speed of the transmission output shaft 24. The steady state secondary pulley pressure, the maximum secondary pulley pressure, the maximum line pressure, and the ratio maintenance value, the transmission fluid temperature, and the current ratio are collectively illustrated in FIG. 4 by inputs 354. The first downshift maximums module 344 may determine the first maximum downshift ROC 348 using one or more functions or lookup tables that relate values of the inputs to first maximum downshift ROCs. The first downshift maximums module 344 may determine the second maximum downshift ROC 352 using one or more functions or lookup tables that relate values of the inputs to second maximum downshift ROCs.

A second minimum module 356 selects a minimum (smaller) one of the first and second maximum downshift ROCs 348 and 352. The second minimum module 356 outputs the selected one of the first and second maximum downshift ROCs 348 and 352 as a third maximum downshift ROC 360.

A second upshift maximums module 364 determines a fourth maximum upshift ROC 368 in the target ratio for the switching valve 120 in the closed position (i.e., partial mode operation). The fourth maximum upshift ROC 368 corresponds to maximum ROC in the target ratio during an upshift with the switching valve 120 in the closed position. The second upshift maximums module 364 also determines a fifth maximum upshift ROC 372 in the target ratio. The fifth maximum upshift ROC 372 corresponds to maximum ROC in the target ratio during an upshift with the switching valve 120 in the open position (i.e., full mode operation).

The second upshift maximums module 364 determines the fourth and fifth maximum upshift ROCs 368 and 372 based on an engine speed, the steady state primary pulley pressure, the pressure adjustment 268, the transmission fluid temperature, and a state of the torque converter clutch. The engine speed may be measured, for example using an engine speed sensor. The state of the torque converter clutch may be, for example, slipping or not slipping (locked).

The steady state primary pulley pressure, the engine speed, the transmission fluid temperature, the state of the torque converter clutch, and the pressure adjustment 268 are collectively illustrated in FIG. 4 by inputs 376. The second upshift maximums module 364 may determine the fourth maximum upshift ROC 368 using one or more functions or lookup tables that relate values of the inputs to fourth maximum upshift ROCs. The second upshift maximums module 364 may determine the fifth maximum upshift ROC 372 using one or more functions or lookup tables that relate values of the inputs to fifth maximum upshift ROCs.

A second downshift maximums module 380 determines a fourth maximum downshift ROC 384 in the target ratio for the switching valve 120 in the closed position (i.e., partial mode operation). The fourth maximum downshift ROC 384 corresponds to maximum ROC in the target ratio during a downshift with the switching valve 120 in the closed position. The second downshift maximums module 380 also determines a fifth maximum downshift ROC 388 in the target ratio. The fifth maximum downshift ROC 388 corresponds to maximum ROC in the target ratio during a downshift with the switching valve 120 in the open position (i.e., full mode operation).

The second downshift maximums module 380 determines the fourth and fifth maximum downshift ROCs 384 and 388 based on the engine speed, the steady state secondary pulley pressure, the pressure adjustment 268, the transmission fluid temperature, and the state of the torque converter clutch. The steady state secondary pulley pressure, the engine speed, the transmission fluid temperature, the state of the torque converter clutch, and the pressure adjustment 268 are collectively illustrated in FIG. 4 by inputs 392. The second downshift maximums module 380 may determine the fourth maximum downshift ROC 384 using one or more functions or lookup tables that relate values of the inputs to fourth maximum downshift ROCs. The second downshift maximums module 380 may determine the fifth maximum downshift ROC 388 using one or more functions or lookup tables that relate values of the inputs to fifth maximum downshift ROCs.

Figure 5:
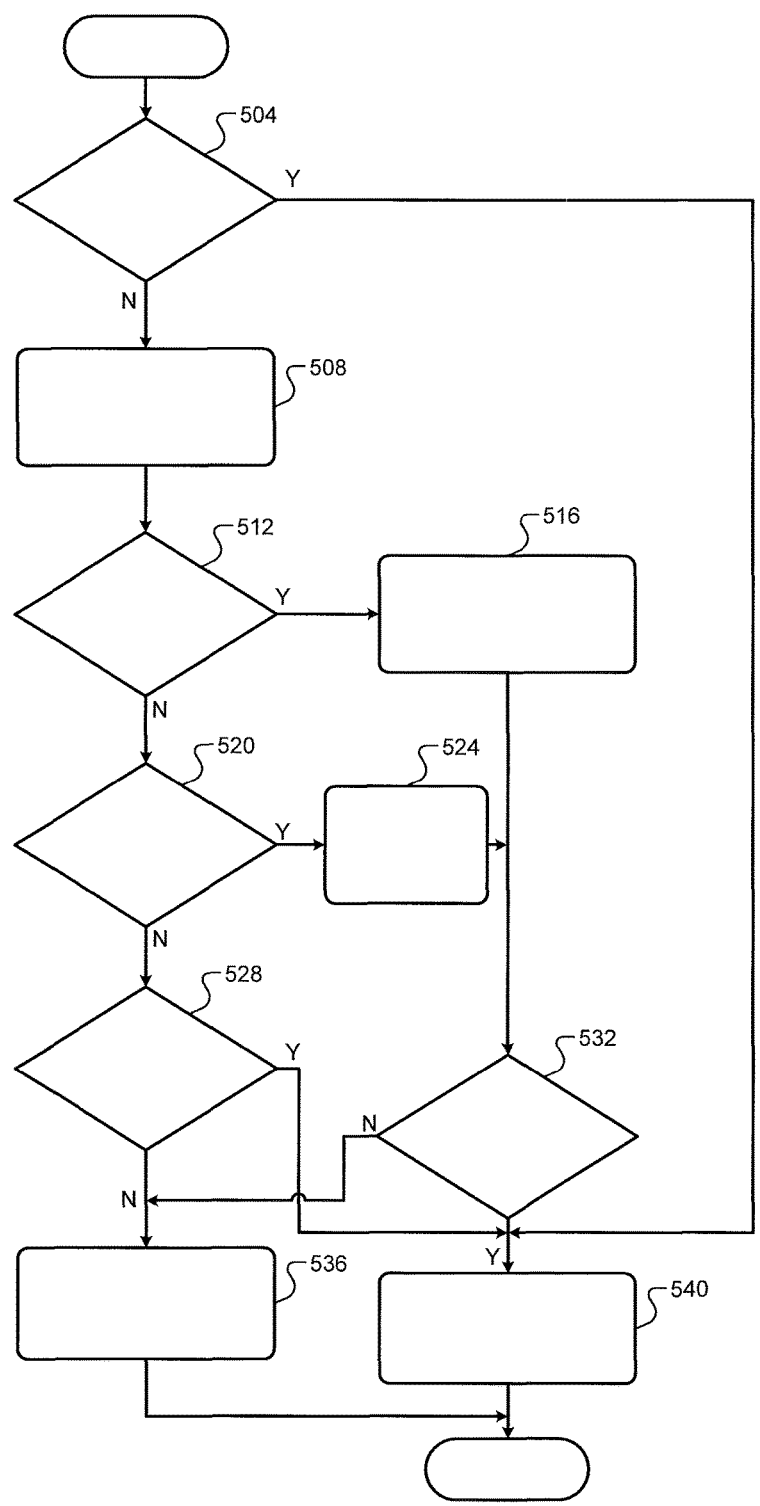
FIG. 5 is a flowchart depicting an example method of controlling a switching valve of a transmission fluid pump.

The switching valve control module 240 controls the switching valve 120 based on comparisons of one of (i) the target ROC 210 and (ii) the maximum ROC 312 with one or more of (i) the third maximum upshift ROC 340, (ii) the third maximum downshift ROC 360, (iii) the fourth maximum upshift ROC 368, (iv) the fifth maximum upshift ROC 372, (v) the fourth maximum downshift ROC 384, and (vi) the fifth maximum downshift ROC 388. FIG. 5 includes a flowchart depicting an example method of controlling the switching valve 120.

Referring now to FIGS. 3 and 5, control begins with 504 where the open module 296 determines whether one or more of the open conditions are present. If 504 is true, the open module 296 generates the open signal 300, and control continues with 540. The switching valve control module 240 transitions the switching valve 120 to the open position or maintains the switching valve 120 in the open position at 540. If 504 is false, control continues with 508.

At 508, the maximum ROC module 316 determine the third maximum upshift ROC 340, the third maximum downshift ROC 360, the fourth maximum upshift ROC 368, the fifth maximum upshift ROC 372, the fourth maximum downshift ROC 384, and the fifth maximum downshift ROC 388. These determinations are discussed above with respect to FIG. 4.

At 512, the switching valve control module 240 determines whether the shift signal 308 indicates that the driver has commanded an upshift. If 512 is true, the switching valve control module 240 selects the third maximum upshift ROC 340 and the fourth maximum upshift ROC 368 for comparisons at 516, and control continue with 532. 532 is discussed further below. If 512 is false, control continue with 520.

The switching valve control module 240 determines whether the shift signal 308 indicates that the driver has commanded a downshift at 520. If 520 is true, the switching valve control module 240 selects the third maximum downshift ROC 360 and the fourth maximum downshift ROC 384 for comparisons at 524, and control continue with 532. If 520 is false, control continues with 528.

At 528, the switching valve control module 240 determine whether the target ROC 210 is greater than one or more of: the third maximum upshift ROC 340, the third maximum downshift ROC 360, the fourth maximum upshift ROC 368, and the fourth maximum downshift ROC 384. If 528 is true, the switching valve control module 240 transitions the switching valve 120 to the open position or maintains the switching valve 120 in the open position at 540. If 528 is false, the switching valve control module 240 transitions the switching valve 120 to the closed position or maintains the switching valve 120 in the closed position at 536. In this manner, the switching valve control module 240 operates the switching valve 120 in the open position when the target ROC 210 is greater than at least one of the third maximum upshift ROC 340, the third maximum downshift ROC 360, the fourth maximum upshift ROC 368, and the fourth maximum downshift ROC 384. When neither an upshift nor a downshift has been commanded, the switching valve control module 240 uses the target ROC 210 in the comparisons.

At 532, the switching valve control module 240 determine whether the maximum ROC 312 for the upshift or downshift is greater than one or more of the selected maximum ROCs. For example, when a downshift has been commanded, the switching valve control module 240 determines whether the maximum ROC 312 for the downshift is greater than one or more of third maximum downshift ROC 360 and the fourth maximum downshift ROC 384. When an upshift has been commanded, the switching valve control module 240 determines whether the maximum ROC 312 for the upshift is greater than one or more of third maximum upshift ROC 340 and the fourth maximum upshift ROC 368. If 532 is true, the switching valve control module 240 transitions the switching valve 120 to the open position or maintains the switching valve 120 in the open position at 540. If 532 is false, the switching valve control module 240 transitions the switching valve 120 to the closed position or maintains the switching valve 120 in the closed position at 536. In this manner, the switching valve control module 240 operates the switching valve 120 in the open position when the maximum ROC 312 for a shift is greater than at least one of the maximum ROCs for that shift. The switching valve control module 240 uses the maximum ROC 312 in the comparisons when an upshift or a downshift has been commanded.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A transmission fluid control system of a vehicle, comprising:
    a target module that determines a target ratio between a speed of an input shaft and a speed of an output shaft of a continuously variable transmission (CVT) based on an accelerator pedal position;
    a maximum rate of change (ROC) module that determines a maximum ROC of the target ratio; and
    a switching valve control module that, based on a comparison of the maximum ROC and a ROC of the target ratio, selectively actuates a switching valve of the CVT one of (i) from a closed position to an open position and (ii) from the open position to the closed position,
    wherein, when the switching valve is in the closed position, the switching valve: prevents transmission fluid flow through a flow path between a transmission fluid pump and a pressure regulator valve of the CVT; and directs transmission fluid flow back to the transmission fluid pump, and
    wherein the switching valve allows transmission fluid flow through the flow path when the switching valve is in the open position.

2. The transmission fluid control system of claim 1 wherein the transmission fluid pump further pumps transmission fluid to the pressure regulator valve through a second flow path both (i) when the switching valve is in the open position and (ii) when the switching valve is in the closed position.

3. The transmission fluid control system of claim 1 wherein the switching valve control module transitions the switching valve of the CVT from the closed position to the open position when the ROC of the target ratio is greater than the maximum ROC.

4. The transmission fluid control system of claim 1 wherein the switching valve control module selectively transitions the switching valve of the CVT from the open position to the closed position when the ROC of the target ratio is less than the maximum ROC.

5. The transmission fluid control system of claim 1 wherein the switching valve control module selectively transitions the switching valve of the CVT from the open position to the closed position when the ROC of the target ratio is less than the maximum ROC and at least one other maximum ROC of the target ratio for when the switching valve is in the closed position.

6. The transmission fluid control system of claim 1 further comprising:
    a target pressure module that, based on the target ratio, determines (i) a first target pressure of transmission fluid applied to a first pulley actuator and (ii) a second target pressure of transmission fluid applied to a second pulley actuator,
    wherein the first pulley actuator is coupled to the input shaft of the CVT and expands and contracts based on a first pressure of the transmission fluid applied to the first pulley actuator,
    wherein the second pulley actuator is coupled to the output shaft of the CVT and expands and contracts based on a second pressure of the transmission fluid applied to the second pulley actuator, and
    wherein one of (i) a belt and (ii) a chain encircles the first and second pulley actuators.

7. The transmission fluid control system of claim 6 further comprising:
    a first pulley valve control module that controls opening of a first valve based on the first target pressure, wherein the first valve receives transmission fluid from the pressure regulator valve and controls transmission fluid flow to the first pulley actuator; and
    a second pulley valve control module that controls opening of a second valve based on the second target pressure, wherein the second valve receives transmission fluid from the pressure regulator valve and controls transmission fluid flow to the second pulley actuator.

8. The transmission fluid control system of claim 1 further comprising:
    a shift module that indicates an upshift when a change in the target ratio is greater than a predetermined value and that determines a second maximum ROC of the target ratio that may occur between a beginning and an end of the upshift,
    wherein the maximum ROC module determines the maximum ROC of the target ratio for upshifts, and
    wherein the switching valve control module selectively actuates the switching valve of the CVT from the closed position to the open position when the second maximum ROC is greater than the maximum ROC.

9. The transmission fluid control system of claim 1 further comprising:
    a shift module that indicates a downshift when a change in the target ratio is greater than a predetermined value and that determines a second maximum ROC of the target ratio that may occur between a beginning and an end of the downshift,
    wherein the maximum ROC module determines the maximum ROC of the target ratio for downshifts, and
    wherein the switching valve control module selectively actuates the switching valve of the CVT from the closed position to the open position when the second maximum ROC is greater than the maximum ROC.

10. The transmission fluid control system of claim 1 further comprising:
    a shift module that indicates that no shift has been commanded when a change in the target ratio is less than a predetermined value,
    wherein the target module further determines a target ROC of the target ratio based on the accelerator pedal position,
    wherein, when no shift has been commanded, the switching valve control module actuates the switching valve from the closed position to the open position when the target ROC is greater than the maximum ROC, and
    wherein, when no shift has been commanded, the switching valve control module actuates the switching valve from the open position to the closed position when the target ROC is less than the maximum ROC.

11. A transmission fluid control method for a vehicle, comprising:
    determining a target ratio between a speed of an input shaft and a speed of an output shaft of a continuously variable transmission (CVT) based on an accelerator pedal position;
    determining a maximum rate of change (ROC) of the target ratio; and
    based on a comparison of the maximum ROC and a ROC of the target ratio, selectively actuating a switching valve of the CVT one of (i) from a closed position to an open position and (ii) from the open position to the closed position,
    wherein, when the switching valve is in the closed position, the switching valve: prevents transmission fluid flow through a flow path between a transmission fluid pump and a pressure regulator valve of the CVT; and directs transmission fluid flow back to the transmission fluid pump, and wherein the switching valve allows transmission fluid flow through the flow path when the switching valve is in the open position.

12. The transmission fluid control method of claim 11 wherein the transmission fluid pump further pumps transmission fluid to the pressure regulator valve through a second flow path both (i) when the switching valve is in the open position and (ii) when the switching valve is in the closed position.

13. The transmission fluid control method of claim 11 further comprising selectively transitioning the switching valve of the CVT from the closed position to the open position when the ROC of the target ratio is greater than the maximum ROC.

14. The transmission fluid control method of claim 11 further comprising selectively transitioning the switching valve of the CVT from the open position to the closed position when the ROC of the target ratio is less than the maximum ROC.

15. The transmission fluid control method of claim 11 further comprising selectively transitioning the switching valve of the CVT from the open position to the closed position when the ROC of the target ratio is less than the maximum ROC and at least one other maximum ROC of the target ratio for when the switching valve is in the closed position.

16. The transmission fluid control method of claim 11 further comprising:
based on the target ratio, determining (i) a first target pressure of transmission fluid applied to a first pulley actuator and (ii) a second target pressure of transmission fluid applied to a second pulley actuator,
wherein the first pulley actuator is coupled to the input shaft of the CVT and expands and contracts based on a first pressure of the transmission fluid applied to the first pulley actuator,
wherein the second pulley actuator is coupled to the output shaft of the CVT and expands and contracts based on a second pressure of the transmission fluid applied to the second pulley actuator, and
wherein one of (i) a belt and (ii) a chain encircles the first and second pulley actuators.

17. The transmission fluid control method of claim 16 further comprising:
controlling opening of a first valve based on the first target pressure, wherein the first valve receives transmission fluid from the pressure regulator valve and controls transmission fluid flow to the first pulley actuator; and
controlling opening of a second valve based on the second target pressure, wherein the second valve receives transmission fluid from the pressure regulator valve and controls transmission fluid flow to the second pulley actuator.

18. The transmission fluid control method of claim 11 further comprising:
indicating an upshift when a change in the target ratio is greater than a predetermined value;
determining a second maximum ROC of the target ratio that may occur between a beginning and an end of the upshift,
wherein determining the maximum ROC includes determining the maximum ROC of the target ratio for upshifts; and
selectively actuating the switching valve of the CVT from the closed position to the open position when the second maximum ROC is greater than the maximum ROC.

19. The transmission fluid control method of claim 11 further comprising:
indicating a downshift when a change in the target ratio is greater than a predetermined value;
determining a second maximum ROC of the target ratio that may occur between a beginning and an end of the downshift,
wherein determining the maximum ROC includes determining the maximum ROC of the target ratio for downshifts; and
selectively actuating the switching valve of the CVT from the closed position to the open position when the second maximum ROC is greater than the maximum ROC.

20. The transmission fluid control method of claim 11 further comprising:
indicating that no shift has been commanded when a change in the target ratio is less than a predetermined value;
determining a target ROC of the target ratio based on the accelerator pedal position;
when no shift has been commanded, actuating the switching valve from the closed position to the open position when the target ROC is greater than the maximum ROC; and
when no shift has been commanded, actuating the switching valve from the open position to the closed position when the target ROC is less than the maximum ROC.

* * * * *